United States Patent
Homt et al.

(10) Patent No.: US 6,334,920 B1
(45) Date of Patent: Jan. 1, 2002

(54) PROCESS FOR MANUFACTURING AN UNFINISHED PIECE FOR VEHICLE TIRES

(75) Inventors: Günter Homt, Garbsen; Michael Glinz, Neustadt; Harry Kunz, Hannover, all of (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 09/058,143

(22) Filed: Apr. 10, 1998

(30) Foreign Application Priority Data

Apr. 11, 1997 (DE) ............................. 197 15 296

(51) Int. Cl.⁷ ............... B29D 30/08; B29B 15/00
(52) U.S. Cl. ............ 156/128.6; 156/123; 156/134; 156/272.6; 156/273.3; 156/274.6
(58) Field of Search ................. 156/96, 110.1, 156/128.6, 130.5, 134, 272.6, 273.3, 274.6, 272.2; 250/324, 492.1

(56) References Cited

U.S. PATENT DOCUMENTS

| | | |
|---|---|---|
| 5,053,246 A | 10/1991 | Shuttleworth et al. |
| 5,283,119 A | 2/1994 | Shuttleworth et al. |
| 5,462,617 A * | 10/1995 | Bender et al. .................. 156/96 |
| 5,466,424 A * | 11/1995 | Kusano et al. .......... 422/186.05 |
| 5,780,132 A * | 7/1998 | Saitoh et al. ................. 428/36.8 |

FOREIGN PATENT DOCUMENTS

| | | | |
|---|---|---|---|
| DE | 3145014 | 5/1983 | |
| DE | 4444994 | 6/1995 | |
| EP | 451425 | 10/1991 | |
| EP | 788870 | * 8/1997 | ................ 156/272.6 |
| JP | 61-19343 | 1/1986 | |
| JP | 7-81306 | 3/1995 | |

OTHER PUBLICATIONS

English language Derwent abstract for DE 3145014, May 1983.*
David F. Lawson, "Corona Discharge Activation and Reconstruction of Elastomer Surfaces," vol. 60, No. 1, Mar.–Apr. 1987, pp. 102–110.*
Jörg Friedrich, "Plasmabehandlung von Polymeren," *Kleben & Dichten—Adhäsion*, Jahrgang 41, pp. 28–33 (Jan.–Feb. 1997).
Gerhard Liebel, "Plasmabehandlung von Polyolefin," *GAK*, Jahrgang 43, pp. 421–429 (Aug. 1990).
Fritz Bloss, "Zur Koronabehandlung von Formteilen," *Sonderdruck aus Oberfläche + JOT*, (Dec. 1988).
Thomas et al., Umweltfreundliche Veredlungsverfahren für Wolle durch Vorbehandlung mit elektrischen Gasentla–dungen (Plasmen), *ITP*, pp. 42–49 (Feb. 1993).
German Office Action dated Oct. 14, 1997 performed in German Patent Application No. 197 15 296.
Paten Abstract of Japan, M–488, vol. 10, No. 167 (Jun. 13, 1986).

* cited by examiner

Primary Examiner—Geoffrey L. Knable
(74) Attorney, Agent, or Firm—Greenblum & Bernstein, P.L.C.

(57) ABSTRACT

The invention relates to a process for manufacturing an unfinished rubber piece for a vehicle tire that includes providing a plurality of tire components composed of unvulcanized rubber mixtures, and treating a surface of at least one of the plurality of tire components with a plasma and/or a flame to increase the adhesiveness of the surface. The unvulcanized rubber mixtures may include partially embedded reinforcing members.

22 Claims, 1 Drawing Sheet

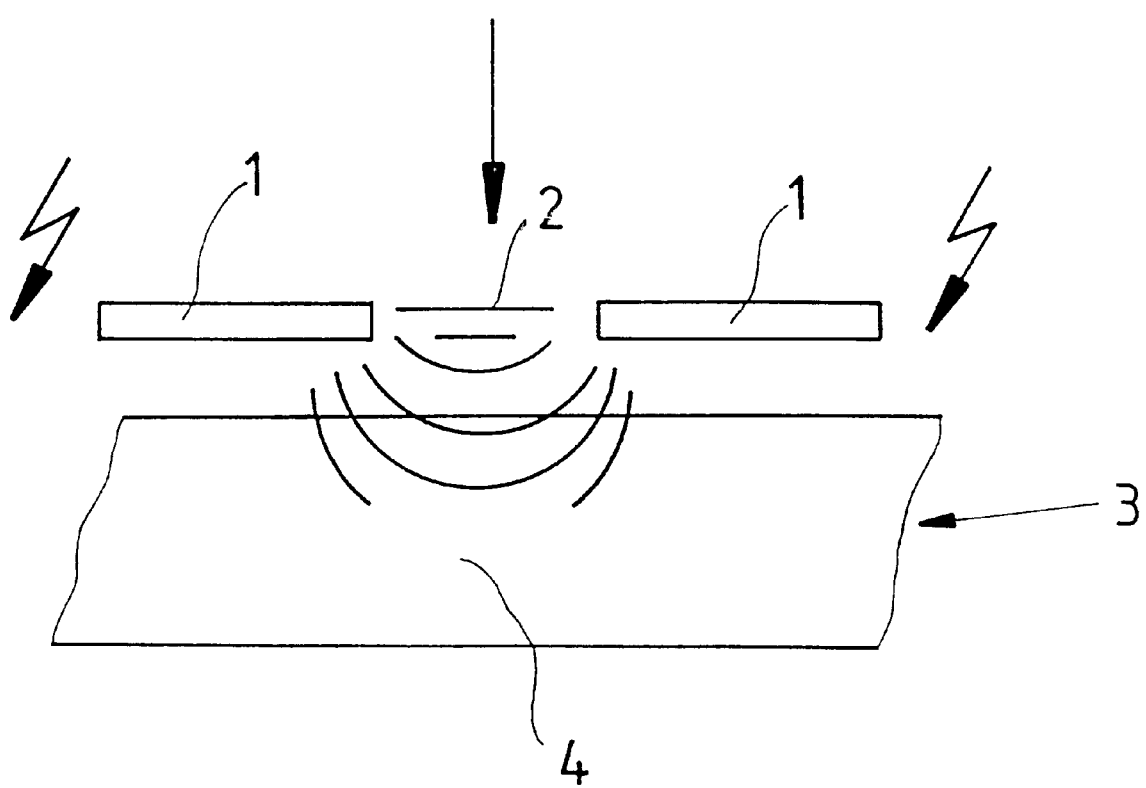

PROCESS FOR MANUFACTURING AN UNFINISHED PIECE FOR VEHICLE TIRES

CROSS-REFERENCE TO RELATED APPLICATION

The present invention claims the priority under 35 U.S.C. §119 of German Application No. 197 15 296.1 filed Apr. 11, 1997, the disclosure of which is expressly incorporated by reference herein in its entirety.

BACKGROUND INFORMATION

1. Field of the Invention

The invention relates to a process for manufacturing an unvulcanized, unfinished rubber fire for a vehicle tire, which is produced by manufacturing various tire components of an unvulcanized rubber mixtures that include partially embedded reinforcing members.

2. Discussion of Background Information

In order to manufacture an unvulcanized, unfinished rubber tire (i.e., one or more components of a tire in an unvulcanized state) that exhibits a sufficient degree of firmness, it is of great importance that the unvulcanized rubber mixtures of the individual layers of the tire components be sufficiently adhesive. Such firmness is necessary in order to transport the unvulcanized, unfinished rubber tire from a tire assembly station to a vulcanization facility. Sufficient adhesiveness of the individual unvulcanized rubber mixtures also is a requirement during vulcanization to give the finished tire the necessary firmness.

It is known that the adhesiveness of unvulcanized rubber mixtures can be increased during the manufacturing process by coating the surface of the rubber mixture with a benzene solution, to produce a partially dissolved surface layer of unvulcanized rubber material. This treatment with a benzene solution, however, is very time-consuming and it may pose a health hazard for the worker. Moreover, to be made safe, the benzene solution treatment requires elaborate suction/exhaust work place systems, so that the maximum allowable workplace concentration value (MAK-value), measured in $ml/m^3$ or ppm (for a gas) and based on 8 hours of workplace exposure for a 40-hour work week, is not exceeded.

Further, the treatment of an unvulcanized rubber mixture with a benzene solution (which is dark) may have other disadvantages. For example, the colored side walls of pneumatic vehicle tires which have been partially dissolved with a benzene solution may develop unsightly discolorations in an unvulcanized state.

Furthermore, sufficient adhesiveness for the manufacturing process is not achievable in every case by coating the unvulcanized rubber material with a benzene solution. In particular, when two different unvulcanized rubber mixtures are to be bound to each other, for example a colored side wall and the rubber mixture surrounding a tire carcass, problems may arise with respect to sufficient adhesiveness in the unvulcanized state, such that the adhesiveness in the vulcanized state will be inadequate.

SUMMARY OF THE INVENTION

By treating at least a portion of the surface of at least one unvulcanized rubber mixture with a plasma and/or a flame, increased adhesiveness of unvulcanized rubber mixtures during the vehicle tire manufacturing process can be attained, while at the same time the use of solvents (such as a benzene solution) can be avoided, thereby enabling a more environmentally friendly process for manufacturing vehicle tires.

With a terminal plasma treatment, one should understand the effect of particles that are created by a gas discharge (e.g., a plasma composed of ion radicals, electrons and/or molecules) on an unvulcanized rubber surface, where the mean temperature of the surface is not raised above 100° C. In plasma treatment processes, one usually distinguishes between a low-pressure plasma and a normal pressure plasma. With a low-pressure plasma, a gas or gas mixture is fed into a process chamber at a relatively low pressure, for example approximately 0.5 mbar to approximately 2 mbar. The gas discharge (plasma) is ignited by using a high-frequency alternating voltage, thereby ionizing the gas medium. Air, noble gases, oxygen or nitrogen, for example, can be used as the gas medium. In accordance with the invention, the gas fragments or gas mixture fragments thus created hit the surface of the unvulcanized rubber mixture, resulting in its modification. Depending on the type of gas or gas mixture used in the process, it becomes possible, for example, to deposit polar groups on generally non-polar unvulcanized rubber.

The low-pressure plasma treatment has the advantage that the unvulcanized rubber surface being treated will generally heat up by only approximately 30° C. to approximately 60° C., such that the surface can also be treated with other materials that can not be deposited under normal pressures without causing damage. Furthermore, the low-pressure plasma process is very efficient since the life-span of the activated particles is high under reduced pressures. Specific gases or gas mixtures can be used due to the self-contained process chamber. Moreover, non-homogeneous or insufficient activation may be avoided.

Another process for treating unvulcanized rubber mixtures is with the use of normal pressure plasmas. These differ from low-pressure plasma processes in that the gas discharge does not take place in a self-contained chamber. Instead, the process operates with ambient air under ambient pressure. A corona-discharge plasma is used as a preferred process.

In principle, however, it also is possible to treat the unvulcanized rubber surface with a high-temperature plasma. However, one must pay close attention to the exposure time of the plasma to ensure that the mean surface temperature does not exceed 100° C.

A flame treatment also has proven effective for treating the surface unvulcanized rubber mixtures. By using a gas flame on the surface of the unvulcanized rubber material, the molecular chains of the rubber may be broken up due to the heat treatment and may become bonded with the oxygen-carrying components of the flame. The flame treatment may be used in combination (e.g., sequentially, one after the other) with the plasma treatment.

A discussion of the plasma treatment process and the flame treatment process is contained in the following references:

1. Jörg Friedricht: Plasmabehandlung von Polymeren, Kleben & Dichten—Adhäsion, Jahrgang 41, 1-2, 1997. S. 28–33. [Plasma Treatment of Polymers, Adhesives & Seals—Adhesion]
2. Gehard Liebel: Plasmabehandlung von Polyolefin, GAK 8/1990. S. 421ff. [Plasma Treatment of Polyolefins]
3. Fritz Bloss: Zur Koronabehandlung von Formteilen, Sonderdruck aus Oberfläche+JOT 12/88 (Vorbehandeln) [Regarding Corona-treatment of Part of a Mold]
4. Thomas H., Herrling, J., Rakowski W., Höcker, H.: Umweltfreundliche Veredlungsverfahren für Wolle durch Vorbehandlung mit elektrischen Gasentladungen (Plasmen), ITP 2/93, S. 42–49 [Environmentally Friendly improvement Process for Wool by Electrical Gas-discharge (Plasma)]

By treating unvulcanized rubber layers in accordance with the invention, it becomes possible to improve the adhesiveness of these unvulcanized rubber mixtures during the manufacturing process. The adhesiveness of an unvulcanized rubber mixture may be increased between unvulcanized, pre-vulcanized and fully vulcanized tire components. The process according to the invention, therefore, can also be used as a process for manufacturing reconditioned tires, with regard to treating and assembling the unvulcanized tire tread. Moreover, the manufacturing of vehicle tires can be performed in accordance with quality requirements and in an environmentally friendly manner, more specifically, without the use of solvents. Due to the increased adhesiveness from the treatment process, unvulcanized rubber mixtures or unvulcanized rubber mixtures that include partially embedded or fully embedded reinforcing members can be applied in specific locations, and after vulcanization of the unvulcanized, unfinished rubber tire, a vehicle tire can be produced that has improved running properties due to the precise positioning of individual layers.

It was surprising to learn that an unvulcanized rubber mixture could be treated with a plasma and/or a flame such that its adhesiveness could be increased in the unfinished (unvulcanized) state, while at the same time the process shows no sign of effecting the cross-linked (i.e., vulcanized) material. It was unexpected to find that surface adhesiveness, which in the case of non-cross-linked rubber can be traced to unsaturated constituents such as oils, could be increased by depositing groups on the unvulcanized rubber surface which, in most cases, are polar. A reduction in adhesiveness should have resulted from such surface modification, which also causes the elimination of double bonds. Nevertheless, in accordance with the invention, it could be determined that the adhesiveness of the unvulcanized rubber material in the manufacturing process could be increased with a plasma treatment process and/or a flame treatment process.

Widely differing types of unvulcanized rubber mixtures can be subjected to the plasma and/or flame treatment processes. For example, mixtures containing natural rubber (NR), butadiene rubber (BR), styrene-butadiene-copolymer (SBR), butyl rubber, synthetic polyisoprene or ethylene-propylene-diene-copolymer, sulfur-cross-linkable rubbers, and mixtures thereof of unvulcanized rubber components, may be subjected to the treatment process. These rubber materials are used with conventional additives to manufacture solid rubber tires and to manufacture pneumatic vehicle tires.

In accordance with the invention, it is advantageous if at least a portion of the unvulcanized rubber surface, representing the terminal region of the unvulcanized rubber mixture, is treated with a plasma and/or with a flame, so that in two overlapping terminal regions, at least one plasma and/or flame treated surface comes in contact with the surface of the other terminal region. In the application of discrete layers of the same or different unvulcanized rubber materials, a problem heretofore has existed of this overlapping region not exhibiting sufficient adhesion during the manufacturing process due to a lack of adhesiveness. For example, during the manufacturing process, so-called splice ends (contact ends) may not make sufficient contact or remain in contact with each other. By treating at least one unvulcanized rubber surface with a plasma and/or a flame to improve the contact with the other unvulcanized rubber layer, these regions may be prevented from tearing apart, thereby enhancing the quality of the vehicle tire manufacturing process.

The process in accordance with the invention has additional advantages in the manufacturing process of pneumatic vehicle tires. A vehicle tire generally includes an air-tight layer in the radial interior, a carcass embedded in rubber which is positioned over the radial interior and wrapped around the bead cores, a tire tread that defines the radial exterior of the pneumatic vehicle tire, a belt package which is located between the carcass and the tire tread, and side walls comprising a rubber material that form the axial boundaries of the tire. Each individual unvulcanized rubber component has a different composition, but sufficient adhesiveness between the individual tire components is achieved by using the process in accordance with the invention. Consequently, colored side walls now can be applied to the unvulcanized rubber layer of the rubberized cord ply carcass (which is essentially located underneath it) without being smudged by the dark benzene solution, since additional coating treatments, such as with a benzene solution, can be avoided. It also is possible to apply a non-black label of unvulcanized rubber material to the side wall of the tire, for example. Hence, a label and in particular a small label, can be placed in a defined location where it will remain after vulcanization.

Another advantage for the manufacture of pneumatic vehicle tires in accordance with the invention is that assembly on a spooling drum can be further automated, since the danger of explosion is reduced by avoiding the use of benzene solutions. Furthermore, it is possible to subject the elastic parts of a pneumatic vehicle tire which are under particularly high dynamic stresses to a plasma and/or a flame treatment before vulcanization. The axial boundary of the belt, which usually includes metal reinforcing members that are embedded in unvulcanized rubber, is particularly subject to high dynamic loadings. In accordance with the invention,, it is possible to treat the unvulcanized mixtures of the belt and the carcass with the plasma process and/or the flame process, such that the firmness of the tire after vulcanization is increased as well.

Another application of the process according to the invention involves the binding which is embedded in the unvulcanized rubber layers of the belt package, and which is pulled by a spooling drum and afterwards wound onto the belt. In order to peel this spooling binding off the spooling drum, it is necessary for the unvulcanized rubber material in which the binding is embedded not to be adhesive. It is possible to treat the unvulcanized rubber material of the binding with a plasma and/or a flame before positioning the binding on the belt, so that its adhesiveness is increased only during this phase of the manufacturing process, and optimal spooling of this binding onto the partial tire can proceed without compromising the quality of the pneumatic vehicle tire, due to insufficient adhesion with the belt.

It is particularly advantageous if the underside of the unvulcanized rubber layer of the tire tread is treated with a plasma and/or a flame. Difficulties in achieving sufficient adhesiveness in past manufacturing processes arose where the belt and the underside of the tire tread were comprised of different unvulcanized rubber mixtures. Since this adhesiveness can be increased in accordance with the invention, resulting in improved adhesion of the tire tread in the vulcanized state, the danger of tire tread separation can be avoided to a large degree. Another advantage of treating the tire tread with a plasma and/or a flame is that the contact regions (i.e., the overlapping regions) of both terminal ends of the unvulcanized rubber mixtures of the tire tread can be subjected to the treatment. In particular, with tire treads that contain silicic acid, which gives a tire in its vulcanized state a low rolling resistance and good wet traction, openings in this splice region have been observed. The invention, however, solves this problem, so that high-quality tires, manufactured in a simple and environmentally friendly process manner, can be produced.

It is preferable if a corona-discharge process is used as the plasma treatment process. This process is economical and can be employed with relatively low equipment expenditures.

Different processes are known as corona-discharges, for example a high frequency spark discharge process and a low frequency spark discharge process. In a high frequency discharge process, a single electrode under a high voltage (greater than 15 kV) may be discharged to the corona. Objects in the immediate vicinity (such the surface of an unvulcanized rubber mixture) are the targets of this gas discharge. An advantage of a high frequency spark discharge process lies in its efficiency, since the magnitude of the voltage of the electrode can be regulated in an exact manner. Thus, the corona treatment of an unvulcanized rubber layer can be optimized.

In contrast with a high frequency spark discharge (which operates in the range of around 25 KHz), a low-frequency spark discharge operates in the range of approximately 50 Hz to 60 Hz. The discharged gas extends beyond the electrode device by an air stream that runs transverse to the discharge direction, and therefore can act on the surface to be treated, such as an unvulcanized rubber surface. A low frequency discharge process is preferred in accordance with the invention, since it can be performed in a relatively simple manner and requires less elaborate equipment setup. On this point, one should refer to reference number three (3) listed above (i.e., Fritz Bloss: Zur Koronabehandlung von Formteilen, Sonderdruck aus Oberfläche+JOT 12/88 (Vorbehandeln)).

Air is the preferred gas medium for the plasma treatment process. The surface of the unvulcanized rubber material can be treated in a simple manner due to the ease of operation and the equipment associated therewith. It is hypothesized that oxygen containing compounds polarize the unvulcanized rubber surface. This could be one of the reasons why the adhesiveness of the unvulcanized rubber is improved in the manufacturing process. In principle, however, other gases that are suitable to modify the surface also could be used. Since most unvulcanized rubber materials are of nonpolar nature, it would seem advantageous to use polar compounds (such as oxygen or halogens) for the gas medium during the plasma treatment. Further, to positively influence the vulcanization process on the surface of the unvulcanized rubber layer, it also is conceivable to use sulfur-containing substances in the gas or gas mixture.

The unvulcanized rubber mixture also may be subjected to a plasma and/or a flame treatment immediately after the unvulcanized rubber mixture leaves an extruding process. During this phase of manufacturing, it is possible to treat the elongated unvulcanized rubber mixture across its entire surface area by placing a low frequency spark discharge device at the exit of the extruder, so that the ejected unvulcanized rubber layer is treated in a simple process step. Another location for treating an unvulcanized rubber mixture during a manufacturing process, for example, is to pivot a low frequency spark discharge device around a tire assembly drum, so that the splice regions can be targeted for a plasma and/or a flame treatment.

The present invention provides a process for manufacturing an unfinished rubber piece for a vehicle tire that includes providing a plurality of tire components composed of unvulcanized rubber mixtures, and treating a surface of at least one of the plurality of tire components with a plasma and/or a flame to increase the adhesiveness of the surface. The unvulcanized rubber mixtures may include partially embedded reinforcing members. Moreover, this surface may include a first terminal region, this first terminal region may overlappingly contact a second terminal region that includes a surface of another of the tire components, and the process may further include treating the first terminal region and/or the second terminal region with the plasma and/or the flame where the first terminal region contacts the second terminal region. A pneumatic tire may include the unfinished rubber piece, and the process may further include extending a rubberized tire carcass from an apex region of the vehicle tire to two bead areas, positioning a rubber tread on a radial exterior of the vehicle tire, arranging a rubberized belt package between the tread and the tire carcass, positioning an interior layer on a radial interior of the vehicle tire, and positioning rubber side walls that border the radial exterior of the vehicle tire. The rubber tread may have a surface impact region and a surface portion that contacts a remainder of the unfinished rubber piece, and the process may further include treating the surface impact region and/or the surface portion that contacts the remainder of the unfinished rubber piece with the plasma and/or the flame.

According to the present invention, the plasma treatment may involve a corona-discharge method/treatment. The process may further include an extrusion process, as well as surface treating the unvulcanized rubber mixture with the plasma and/or the flame directly after the extrusion process. The process may include a spooling process on a tire assembly drum, as well as surface treating the unvulcanized rubber mixture with the plasma and/or the flame during the spooling process.

The present invention also provides an unfinished rubber piece for manufacturing a vehicle tire that includes a plurality of tire components, where each of the tire components is composed of an unvulcanized rubber mixture, where the tire components include partially embedded reinforcing members, and where at least a portion of a surface of at least one unvulcanized-rubber mixture is treated with the plasma and/or the flame. The unfinished rubber piece may also include a first terminal region comprising a part of the surface of the unvulcanized rubber mixture that is treated with the plasma and/or the flame, and a second terminal region comprising a surface of another of the plurality of tire components, where the second terminal region overlaps the first terminal region, and where the first terminal region comes into contact with the surface of the second terminal region. The vehicle tire may be a pneumatic tire, and the plurality of tire components may include a rubberized tire carcass that extends from an apex region of the vehicle tire to two bead areas, a rubber tread disposed on a radial exterior of the vehicle tire, a rubberized belt package arranged between the tread and the tire carcass, an interior layer disposed on a radial interior of the vehicle tire, and rubber side walls bound to the radial exterior of the vehicle tire. The rubber tread may include a surface impact region and a surface portion that contacts a remainder of the unvulcanized unfinished rubber vehicle tire, where the surface impact region and/or the surface portion that contacts the remainder of the unvulcanized unfinished rubber vehicle tire is treated the plasma and/or the flame. The rubber tread may further include silicic acid as a filler material. The surface of the unvulcanized rubber mixture may be treated with a plasma treatment, where the plasma treatment is a corona-discharge treatment.

The present invention also provides a process for treating an unvulcanized rubber mixture with a treatment device having at least one of a plasma and a flame that includes guiding the unvulcanized mixture along a path, positioning the treatment device adjacent a surface of the unvulcanized rubber mixture, and directing the plasma and/or the flame toward the surface, whereby adhesiveness of the surface is increased. The unvulcanized rubber mixture may include fully embedded or partially embedded reinforcing members. An unfinished vehicle tire may include the unvulcanized rubber mixture, and the process may further include extending a rubberized tire carcass from an apex region of the vehicle tire to two bead areas, positioning a rubber tread on a radial exterior of the vehicle tire, arranging a rubberized belt package between the tread and the tire carcass, positioning an interior layer on a radial interior of the vehicle tire, and positioning rubber side walls that border the radial exterior of the vehicle tire. This rubber tread may have a surface impact region and a surface portion that contacts a remainder of the unfinished vehicle tire, and the process may further include directing the plasma and/or the flame toward at least one of the surface impact region and the surface portion that contacts the remainder of the unfinished rubber vehicle tire. Moreover, the treatment device may be a corona-discharge plasma treatment device. Further, the process may include an extrusion process, as well as directing the plasma and/or the flame toward the surface of the unvulcanized rubber mixture directly after the extrusion process. Moreover, the process may include a spooling process on a tire assembly drum, as well as directing the plasma and/or the flame toward the surface of the unvulcanized rubber mixture during the spooling process.

Further, the aforementioned and following characteristic features of the present invention can be used not only in the described combinations, but also in other combinations or alone, without departing from the scope of the invention. Further embodiments and advantages can be seen from the detailed description and the accompanying FIGURE.

BRIEF DESCRIPTION OF THE DRAWING

The present invention is further described in the detailed description which follows, in reference to the noted drawing by way of a non-limiting example of a preferred embodiment of the present invention, wherein:

The FIGURE schematically illustrates a surface of unvulcanized rubber material being subjected to a plasma treatment by a gas discharge device.

DETAILED DESCRIPTION OF THE INVENTION

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing making apparent to those skilled in the art how the several forms of the invention may be embodied in practice.

The process in accordance with invention can be carried out with the low frequency corona treatment device of Arcotec Oberflächentechnik GmbH, specifically the model Arcojet PG 051, which includes a semiconductor generator having an integrated transformer for creating the high voltage and an electrode head for the spark discharge. The electrodes are located in a Teflon insert of the metal housing, and the housing is firmly connected with the generator via a flexible hose for supplying blown air and another flexible hose that contains the high voltage cable.

The application of this device is illustrated schematically in the FIGURE. The electrode head, which includes two electrodes 1, 1, is positioned at a distance of approximately 4 mm to approximately 15 mm from the unvulcanized rubber mixture 3 to be treated. Unvulcanized rubber material 3 comprises a silicic-acid-containing tire tread mixture (an unvulcanized rubber mixture that contains, for example, SBR, BR and NR), so that gas particles (air particles) 2 can have an effect on the surface 4 when electrodes 1, 1 are charged (or ignited). The air stream, indicated by the arrow in the FIGURE, causes discharged particles to be carried out of the space between the electrodes and to collide with unvulcanized rubber surface 4. The duration of treatment varies between approximately 0.17 seconds and approximately 0.3 seconds.

After being treated in this manner, unvulcanized rubber mixture 3 provides good adhesiveness with an untreated, unvulcanized rubber surface. However, in principle it is possible to treat both unvulcanized rubber surfaces which will be brought into contact with a plasma and/or a flame. For the above-noted discharge device (i.e., the Arcojet PG 051), the sum of the duration of both unvulcanized rubber treatments should be less than approximately 0.6 seconds. This range is advantageous for the adhesiveness in the unvulcanized state to be increased sufficiently during the manufacturing process, and for the firmness of bonding to another elastomeric layer to be provided in the vulcanized state.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular materials and embodiments, the invention is not intended to be limited to the particulars disclosed herein; rather, the invention extends to a functionally equivalent structures, methods and uses, such as are within the scope of the appended claims.

What is claimed is:

1. A process for manufacturing an unfinished rubber piece a vehicle tire, comprising:

providing a plurality of tire components composed of unvulcanized rubber mixtures;

treating a surface of at least one of the plurality of tire components with at least one of a plasma and a flame to increase the adhesiveness of the surface; and adhering at least a portion of at least a selected one of the plurality of tire components to the treated surface of the at least one tire component.

2. The process according to claim 1, the unvulcanized rubber mixtures including partially embedded reinforcing members.

3. The process according to claim 1, wherein the surface of the at least one of the plurality of tire components includes a first terminal region and a surface of one of a same and another of the plurality of tire components includes a second terminal region, the process further comprising:

the treating of the surface comprising treating at least one of the first terminal region and the second terminal region with the at least one of the plasma and the flame where the first terminal region will contact the second terminal region; and the adhering comprising overlappingly contacting the first terminal region to the second terminal region.

4. The process according to claim 1, wherein an unfinished pneumatic tire includes the unfinished rubber piece, and the process further comprises;

extending a rubberized tire carcass from an apex region of the pneumatic tire to two bead areas;

positioning a rubber tread on a radial exterior of the pneumatic tire;

arranging a rubberized belt package between the tread and the tire carcass;

positioning an interior layer on a radial interior of the pneumatic tire; and positioning rubber side walls that border the radial exterior of the pneumatic tire.

5. The process according to claim 4, the rubber tread including a surface impact region and a surface portion that contacts a remainder of the unfinished rubber piece, the process further comprising treating at least one of the surface impact region and the surface portion that contacts the remainder of the unfinished rubber piece with the at least one of the plasma and the flame.

6. The process according to claim 1, wherein the plasma treatment comprises a corona-discharge method.

7. The process according to claim 1, further comprising:

an extrusion process; and surface treating the unvulcanized rubber mixture with the at least one of the plasma and the flame directly after the extrusion process.

8. The process according to claim 1, further comprising:

a spooling process on a tire assembly drum; and surface treating the unvulcanized rubber mixture with the at least one of the plasma and the flame during the spooling process.

9. A process for treating an unvulcanized rubber mixture with a treatment device having at least one of a plasma and a flame, comprising:

guiding the unvulcanized mixture along a path;

positioning the treatment device adjacent a surface of the unvulcanized rubber mixture;

directing the at least one of the plasma and the flame toward the surface, whereby adhesiveness of the surface to at least one of a same and a different unvulcanized rubber mixture is increased.

10. The process according to claim 9, the unvulcanized rubber mixture including fully embedded reinforcing members.

11. The process according to claim 9, the unvulcanized rubber mixture including partially embedded reinforcing members.

12. The process according to claim 9, wherein an unfinished vehicle tire includes the unvulcanized rubber mixture, the process further comprising:

extending a rubberized tire carcass from an apex region of the vehicle tire to two bead areas;

positioning a rubber tread on a radial exterior of the vehicle tire;

arranging a rubberized belt package between the tread and the tire carcass;

positioning an interior layer on a radial interior of the vehicle tire; and positioning rubber side walls that border the radial exterior of the vehicle tire.

13. The process according to claim 12, the rubber tread including a surface impact region and a surface portion that contacts a remainder of the unfinished vehicle tire, the process further comprising directing the at least one of the plasma and the flame toward at least one of the surface impact region and the surface portion that contacts the remainder of the unfinished rubber vehicle tire.

14. The process according to claim 9, wherein the treatment device comprises a corona-discharge plasma treatment device.

15. The process according to claim 9, further comprising:

an extrusion process; and directing the at least one of the plasma and the flame toward the surface of the unvulcanized rubber mixture directly after the extrusion process.

16. The process according to claim 9, further comprising:

a spooling process on a tire assembly drum; and directing the at least one of the plasma and the flame toward the surface of the unvulcanized rubber mixture during the spooling process.

17. A process for manufacturing an unfinished pneumatic vehicle tire from an unfinished rubber piece, the process comprising:

forming the unfinished rubber piece, the forming comprising:

providing a plurality of unvulcanized rubber mixture tire components, some of the plurality of unvulcanized rubber mixture tire components having at least partially embedded reinforcing members;

treating a surface at least one of the plurality of unvulcanized rubber mixture tire components with at least one of a plasma and a flame to increase the adhesiveness of the surface, wherein the surface of the at least one of the plurality of unvulcanized rubber mixture tire components includes a first terminal region and a surface of one of a same and another of the plurality of unvulcanized rubber mixture tire components includes a second terminal region;

overlappingly contacting the first terminal region and the second terminal region;

the treating of the surface comprising treating at least one of the first terminal region and the second terminal region with the at least one of the plasma and the flame where the first terminal region will contact the second terminal region; and the overlappingly contacting of the first and second terminal regions adhering the at least one of the treated first terminal region and the treated second terminal region to the other of the second terminal region and the first terminal region;

extending a rubberized tire carcass from an apex region of the pneumatic vehicle tire to two bead areas;

positioning a rubber tread on a radial exterior of the pneumatic vehicle tire;

arranging a rubberized belt package between the tread and the tire carcass;

positioning an interior layer on a radial interior of the pneumatic vehicle tire; and positioning rubber side walls that border the radial exterior of the pneumatic vehicle tire.

18. The process according to claim 17, the rubber tread including a surface impact region and a surface portion that contacts a remainder of the unfinished rubber piece, the process further comprising treating at least one of the surface impact region and the surface portion that contacts the remainder of the unfinished rubber piece with the at least one of the plasma and the flame.

19. The process according to claim 17, wherein the plasma treatment comprises a corona-discharge method.

20. A process for forming an unfinished vehicle tire from an unvulcanized rubber mixture, wherein the unvulcanized rubber is treated with a treatment device having at least one of a plasma and a flame, the process comprising:

guiding the unvulcanized rubber mixture along a path, the unvulcanized rubber mixture comprising one of fully and partially embedded reinforcing members along a path;

positioning the treatment device adjacent a surface of the unvulcanized rubber mixture;

directing the at least one of the plasma and the flame toward the surface, whereby adhesiveness of the surface to at least one of a same and a different unvulcanized rubber mixture is increased;

extending a rubberized tire carcass from an apex region of the vehicle tire to two bead areas;

positioning a rubber tread on a radial exterior of the vehicle tire;

arranging a rubberized belt package between the tread and the tire carcass;

positioning an interior layer on a radial interior of the vehicle tire; and positioning rubber side walls that border the radial exterior of the vehicle tire.

21. The process according to claim 20, the rubber tread including a surface impact region and a surface portion that contacts a remainder of the unfinished vehicle tire, the process further comprising directing the at least one of the plasma and the flame toward at least one of the surface impact region and the surface portion that contacts the remainder of the unfinished rubber vehicle tire.

22. The process according to claim 20, wherein the treatment device comprises a corona-discharge plasma treatment device.

* * * * *